(12) United States Patent
Yang et al.

(10) Patent No.: US 11,901,733 B2
(45) Date of Patent: Feb. 13, 2024

(54) HYBRID PASSIVE POWER FILTER AND THREE-PHASE POWER SYSTEM

(71) Applicant: QINGYUAN POWER SUPPLY BUREAU OF GUANGDONG POWER GRID CORPORATION, Guangdong (CN)

(72) Inventors: Fang Yang, Guangdong (CN); Xiaoliang Tang, Guangdong (CN); Yabing Zhou, Guangdong (CN); Wanyu Ye, Guangdong (CN)

(73) Assignee: QINGYUAN POWER SUPPLY BUREAU OF GUANGDONG POWER GRID CORPORATION, Guangdong (CN)

(*) Notice: Subject to any disclaimer, the term of this patent is extended or adjusted under 35 U.S.C. 154(b) by 0 days.

(21) Appl. No.: 17/793,032

(22) PCT Filed: Aug. 10, 2020

(86) PCT No.: PCT/CN2020/108194
§ 371 (c)(1),
(2) Date: Jul. 14, 2022

(87) PCT Pub. No.: WO2021/227269
PCT Pub. Date: Nov. 18, 2021

(65) Prior Publication Data
US 2023/0047659 A1    Feb. 16, 2023

(30) Foreign Application Priority Data
May 15, 2020 (CN) .......................... 202010415125.6

(51) Int. Cl.
*H02J 3/01* (2006.01)
*H02J 3/18* (2006.01)

(52) U.S. Cl.
CPC .............. *H02J 3/01* (2013.01); *H02J 3/1807* (2013.01)

(58) Field of Classification Search
CPC ................................. H02J 3/01; H02J 3/1807
(Continued)

(56) References Cited

FOREIGN PATENT DOCUMENTS

| CN | 101083397 A | 12/2007 |
|---|---|---|
| CN | 103746380 A | 4/2014 |

(Continued)

OTHER PUBLICATIONS

International Search Report corresponding to PCT/CN2020/108194; dated Dec. 28, 2020; 5 pages.

*Primary Examiner* — Daniel Kessie
*Assistant Examiner* — Dru M Parries
(74) *Attorney, Agent, or Firm* — Reising Ethington P.C.

(57) ABSTRACT

Provided are hybrid passive power filter and a three-phase power system. The hybrid passive power filter includes: a series passive harmonic isolation unit, a parallel passive filtering unit, and a harmonic load; the series passive harmonic isolation unit has an input terminal electrically connected to a power grid and an output terminal electrically connected to a first terminal of the harmonic load, and the series passive harmonic isolation unit is configured to isolate harmonics; and the parallel passive filtering unit has an input terminal electrically connected to the output terminal of the series passive harmonic isolation unit and an output terminal electrically connected to a second terminal of the harmonic load, and the parallel passive filtering unit is configured to filter out harmonics.

8 Claims, 4 Drawing Sheets

(58) Field of Classification Search
USPC .......................................................... 307/105
See application file for complete search history.

(56) References Cited

FOREIGN PATENT DOCUMENTS

| | | |
|---|---|---|
| CN | 103746381 A | 4/2014 |
| CN | 203660535 U | 6/2014 |
| CN | 206379727 U | 8/2017 |
| CN | 107230981 A | 10/2017 |
| CN | 107276090 A | 10/2017 |
| CN | 209963761 U | 1/2020 |
| CN | 111509720 A | 8/2020 |

HYBRID PASSIVE POWER FILTER AND THREE-PHASE POWER SYSTEM

CROSS-REFERENCE TO RELATED APPLICATION

This is a National stage application, filed under 37 U.S.C. 371, of International Patent Application No. PCT/CN2020/108194, filed on Aug. 10, 2020, which is based on and claims priority to Chinese Patent Application No. 202010415125.6 filed with the China National Intellectual Property Administration (CNIPA) on May 15, 2020, the disclosure of which is incorporated herein by reference in its entirety.

TECHNICAL FIELD

The present disclosure relates to the field of power filters and, for example, relates to a hybrid passive power filter and a three-phase power system.

BACKGROUND

With the widespread adoption of power electronic equipment and non-linear loads, a large number of harmonics are generated, which not only pose a threat to power equipment itself, but also affect the surrounding electrical environment. Thus, suppression of harmonics plays a very important role in the safe and stable operation of a power grid.

In the related art, to suppress the harmonics of a power system, a passive power filter or an active power filter is generally used. A passive power filter and a parallel active power filter are widely used in the related art, but these two types of filters cannot suppress the background harmonics of large power grids or systems for new energy access, and cannot filter out higher harmonics effectively. In addition, the cost of active filters is relatively high, their reliability is low, and active filters cannot be directly applied to high-voltage systems.

SUMMARY

The present disclosure provides a hybrid passive power filter and a three-phase power system, which have a function of isolating and directing harmonics. In such way, the reliability of filters is improved, and the hybrid passive power filter and the three-phase power system are commonly used in high-voltage and low-voltage systems.

An embodiment of the present disclosure provides a hybrid passive power filter, the hybrid passive power filter includes: a series passive harmonic isolation unit, a parallel passive filtering unit, and a harmonic load.

An input terminal of the series passive harmonic isolation unit is electrically connected to a power grid, an output terminal of the series passive harmonic isolation unit is electrically connected to a first terminal of the harmonic load, and the series passive harmonic isolation unit is configured to isolate harmonics.

An input terminal of the parallel passive filtering unit is electrically connected to the output terminal of the series passive harmonic isolation unit, an output terminal of the parallel passive filtering unit is electrically connected to a second terminal of the harmonic load, and the parallel passive filtering unit is configured to filter out harmonics.

Where the parallel passive filtering unit includes a third-order passive filtering branch and a fifth-order passive filtering branch, the third-order passive filtering branch and the fifth-order passive filtering branch which are connected in parallel include one terminal which is electrically connected to the output terminal of the series passive harmonic isolation unit and include another terminal which is electrically connected to the second terminal of the harmonic load.

Optionally, the third-order passive filtering branch includes a first inductor and a first capacitor, a first terminal of the first inductor is electrically connected to the output terminal of the series passive harmonic isolation unit, a second terminal of the first inductor is electrically connected to a first terminal of the first capacitor, and a second terminal of the first capacitor is electrically connected to the second terminal of the harmonic load.

The fifth-order passive filtering branch includes a second inductor and a second capacitor, a first terminal of the second inductor is electrically connected to the first terminal of the first inductor, a second terminal of the second inductor is electrically connected to a first terminal of the second capacitor, and a second terminal of the second capacitor is electrically connected to the second terminal of the first capacitor.

Optionally, the equivalent impedance of the parallel passive filtering unit at an n-th harmonic satisfies the following relationship:

$$Z_F^{(n)} = j\frac{1}{n} \times \frac{(n^2-9)(n^2-25)\omega l_1 \omega l_2}{(n^2-9)\omega l_1 + (n^2-25)\omega l_2}$$

where ω denotes a resonant angular frequency, $l_1$ denotes an inductance of the first inductor, and $l_2$ denotes an inductance of the second inductor.

Optionally, the third-order passive filtering branch and the fifth-order passive filtering branch are replaced with a third-order passive filtering branch.

Optionally, the third-order passive filtering branch includes a third inductor and a third capacitor; and a first terminal of the third inductor is electrically connected to the output terminal of the series passive harmonic isolation unit, a second terminal of the third inductor is electrically connected to a first terminal of the third capacitor, and a second terminal of the third capacitor is electrically connected to the second terminal of the harmonic load.

Optionally, the equivalent impedance of the third-order passive filtering branch at an n-th harmonic satisfies the following relationship:

$$Z_F^{(n)} = j(n\omega l_3 - \frac{1}{n\omega c_3})$$

where ω denotes a resonant angular frequency, $l_3$ denotes an inductance of the third inductor, and $c_3$ denotes a capacitance of the third capacitor.

Optionally, the third-order passive filtering branch and the fifth-order passive filtering branch are replaced with a harmonic current absorbing branch.

Optionally, the harmonic current absorbing branch includes a fourth inductor, a fifth inductor and a fourth capacitor. A first terminal of the fourth inductor is electrically connected to the output terminal of the series passive harmonic isolation unit, a second terminal of the fourth inductor is electrically connected to a first terminal of the fourth capacitor, a second terminal of the fourth capacitor is electrically connected to the second terminal of the harmonic load, and the fifth inductor is connected in parallel with the fourth capacitor.

Optionally, the equivalent impedance of the harmonic current absorbing branch at an n-th harmonic, which absorbs an m-th harmonic, satisfies the following relationship:

$$Z_F^{(n)} = jn\omega l_5 (\frac{1}{m^2-1} - \frac{1}{n^2-1}) = j\frac{n^2-m^2}{n^2-1}n\omega l_4$$

where ω denotes a resonant angular frequency, $l_4$ denotes an inductance of the fourth inductor, and $l_5$ denotes an inductance of the fifth inductor.

An embodiment of the present disclosure also provides a three-phase power system, which includes the above hybrid passive power filter.

According to the hybrid passive power filter provided in an embodiment of the present disclosure, a series passive harmonic isolation unit and a parallel passive filtering unit are set to isolate and direct harmonics in the power grid. An input terminal of the series passive harmonic isolation unit is electrically connected to the power grid, an output terminal of the series passive harmonic isolation unit is electrically connected to a first terminal of a harmonic load, an input terminal of the parallel passive filtering unit is electrically connected to the output terminal of the series passive harmonic isolation unit, and an output terminal of the parallel passive filtering unit is electrically connected to a second terminal of the harmonic load, where the parallel passive filtering unit includes a third-order passive filtering branch and a fifth-order passive filtering branch. In the embodiment of the present disclosure, the series passive harmonic isolation unit and the parallel passive filtering unit are combined to filter out the harmonics in a power system, and the series passive harmonic isolation unit presents large impedance to the harmonics and can isolate the harmonics. The parallel passive filtering unit is connected in parallel with the harmonic load, so that the harmonics generated by the power grid and the load can be filtered out. The parallel passive filtering unit only includes the third-order passive filtering branch and the fifth-order passive filtering branch, with a simple structure and no control system involved, which is conducive to improving the reliability of the hybrid passive power filter and has easy access to a high-voltage system.

DETAILED DESCRIPTION

With the widespread adoption of power electronic equipment and non-linear loads, a large number of harmonics are generated, which not only pose a threat to power equipment itself, but also affect the surrounding electrical environment. Various advanced precision instruments and equipment in the fields of modern information technology, microelectronics technology, numerical control processing technology and the like demand higher and higher power quality, and therefore suppression of harmonics plays a very important role in the safe and stable operation of a power grid. In the related art, a power filter is usually adopted to filter out the harmonics in the power grid to ensure the safe operation of grid equipment. The power filter mainly includes a parallel type, a series type, a hybrid type and other types.

A parallel power filter includes a passive power filter, a parallel active power filter used alone, an injection active power filter and an active power filter based on single-cycle control. The passive power filter can compensate for both harmonics and reactive power with low cost and a simple structure. The parallel active power filter used alone is generally known as a conventional parallel active power filter, and is one solution to industrialize an active power filter in the related art. An injection parallel active filter reduces the capacity of the entire active filter by reducing the voltage applied to the active filter. The active power filter based on single-cycle control in the related art has difficulty in avoiding the generation of harmful direct current components and low-frequency harmonics, the circuit has a limited range of stable operation, and the method used to resolve the direct current components and improve stability adds to the complexity of the system.

A series power filter includes a series active power filter used alone, and a type of filter which is composed of a passive power filter and an active power filter connected in series. These two types of filters present higher impedance to the harmonics on the primary side of a transformer and can isolate harmonics. However, the series power filter cannot compensate for reactive power with a relatively simple function and difficulty in protection. In addition, the series power filter is generally only suitable for voltage-type harmonic sources, and is rarely used.

A hybrid active power filter mainly includes a solution in which a parallel passive power filter is combined with a series active power filter. The use of the hybrid active power filter can reduce costs, but there are a number of passive branches, which are not conducive to dynamic compensation for reactive power.

According to the hybrid passive power filter provided in an embodiment of the present disclosure, a series passive harmonic isolation unit and a parallel passive filtering unit are set to isolate and direct harmonics in a power grid. An input terminal of the series passive harmonic isolation unit is electrically connected to the power grid, an output terminal of the series passive harmonic isolation unit is electrically connected to a first terminal of a harmonic load, an input terminal of the parallel passive filtering unit is electrically connected to the output terminal of the series passive harmonic isolation unit, and an output terminal of the parallel passive filtering unit is electrically connected to a second terminal of the harmonic load. Where the parallel passive filtering unit includes a third-order passive filtering branch and a fifth-order passive filtering branch. In the technical solution provided in the embodiment of the present disclosure, the series passive harmonic isolation unit and the parallel passive filtering unit are combined to filter out the harmonics in a power system, and the series passive harmonic isolation unit presents large impedance to the harmonics and can isolate the harmonics; and the parallel passive filtering unit is connected in parallel with the harmonic load, so that the harmonics generated by the power grid and the load can be filtered out. The parallel passive filtering unit only includes the third-order passive filtering branch and the fifth-order passive filtering branch, with a simple structure and no control system involved, which is conducive to improving the reliability of the hybrid passive power filter and has easy access to a high-voltage system.

Embodiment One

Figure 1:
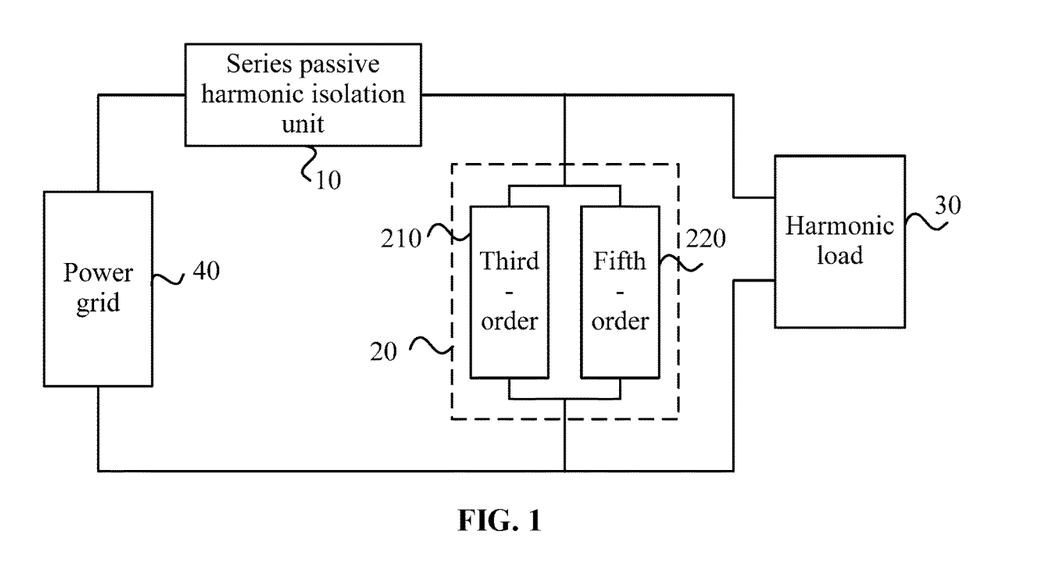
FIG. 1 is a structure diagram of a hybrid passive power filter according to Embodiment one of the present disclosure.

FIG. 1 is a structure diagram of a hybrid passive power filter according to Embodiment one of the present disclosure. Referring to FIG. 1, the hybrid passive power filter provided by Embodiment one of the present disclosure includes: a series passive harmonic isolation unit 10, a parallel passive filtering unit 20, and a harmonic load 30.

An input terminal of the series passive harmonic isolation unit 10 is electrically connected to a power grid 40, an output terminal of the series passive harmonic isolation unit 10 is electrically connected to a first terminal of the harmonic load 30, and the series passive harmonic isolation unit 10 is configured to isolate harmonics.

An input terminal of the parallel passive filtering unit 20 is electrically connected to the output terminal of the series passive harmonic isolation unit 10, an output terminal of the parallel passive filtering unit 20 is electrically connected to a second terminal of the harmonic load 30, and the parallel passive filtering unit 20 is configured to filter out harmonics.

The parallel passive filtering unit 20 includes a third-order passive filtering branch 210 and a fifth-order passive filtering branch 220, the third-order passive filtering branch 210 and the fifth-order passive filtering branch 220 which are connected in parallel include one terminal which is electrically connected to the output terminal of the series passive harmonic isolation unit 10 and include another terminal which is electrically connected to the second terminal of the harmonic load 30.

Exemplarily, the series passive harmonic isolation unit 10 usually includes an inductor and a capacitor which are connected in series, the inductor and the capacitor which are connected in series form a circuit resonant to a fundamental wave, so that the equivalent impedance of the fundamental wave is zero and the circuit presents high impedance to harmonics. Thus, the series passive harmonic isolation unit 10 can isolate harmonics. The series passive harmonic isolation unit 10 in power systems is usually disposed at the primary side of a transformer (not shown in figures), which can effectively isolate harmonics between the power grid 40 and the harmonic load 30. The parallel passive filtering unit 20 is formed by connecting the third-order passive filtering branch 210 and the fifth-order passive filtering branch 220 in parallel, and the third-order passive filtering branch 210 and the fifth-order passive filtering branch 220 form harmonic series resonance respectively, presenting low impedance to harmonics, so that the harmonics generated by the harmonic load 30 are filtered out by the parallel passive filtering unit 20. The parallel passive filtering unit 20 includes the third-order passive filtering branch 210 and the fifth-order passive filtering branch 220, and the series passive harmonic isolation unit 10 presents high impedance to harmonics, so that the equivalent impedance of the parallel passive filtering unit 20 is much smaller than the equivalent impedance of the series passive harmonic isolation unit 10. Thus the parallel passive filtering unit 20 can be simplified, so that the parallel passive filtering unit 20 does not need too many filtering branches and high-pass filters and filtering of harmonics can be achieved, and it is conducive to reactive power compensation for the fundamental wave.

In the embodiment of the present disclosure, the series passive harmonic isolation unit and the parallel passive filtering unit are combined to filter out the harmonics in a power system, and the series passive harmonic isolation unit presents large impedance to the harmonics and can isolate the harmonics. The parallel passive filtering unit is connected in parallel with the harmonic load, so that the harmonics generated by the power grid and the load can be filtered out. The parallel passive filtering unit only includes the third-order passive filtering branch and the fifth-order passive filtering branch, with a simple structure and no control system involved, which is conducive to improving the reliability of the hybrid passive power filter and has easy access to a high-voltage system.

Embodiment Two

Figure 2:
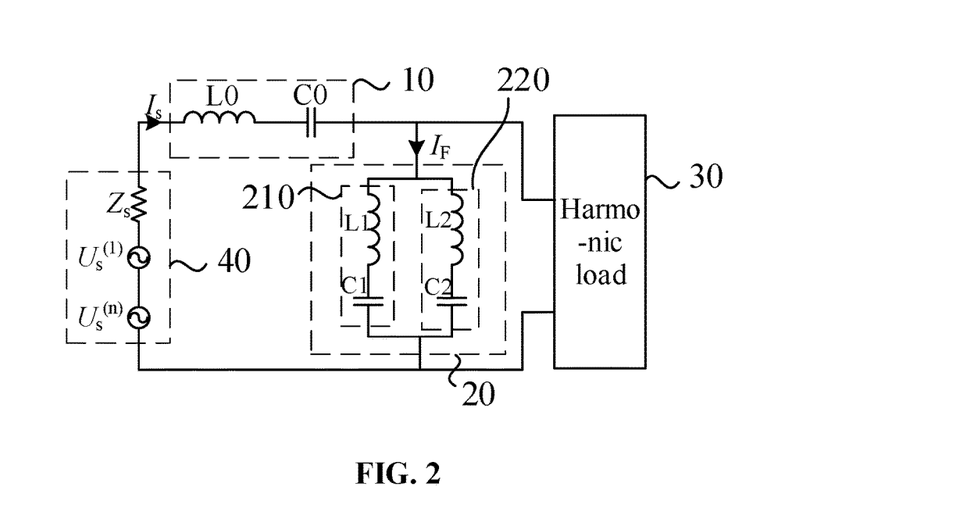
FIG. 2 is a structure diagram of a hybrid passive power filter according to Embodiment two of the present disclosure.

FIG. 2 is a structure diagram of a hybrid passive power filter according to Embodiment two of the present disclosure. Referring to FIG. 2, based on the above embodiment, a third-order passive filtering branch 210 includes a first inductor L1 and a first capacitor C1, the first terminal of the first inductor L1 is electrically connected to the output terminal of a series passive harmonic isolation unit 10, a second terminal of the first inductor L1 is electrically connected to a first terminal of the first capacitor C1, and a second terminal of the first capacitor C1 is electrically connected to a second terminal of the harmonic load 30.

A fifth-order passive filtering branch 220 includes a second inductor L2 and a second capacitor C2, a first terminal of the second inductor L2 is electrically connected to the first terminal of the first inductor 11, a second terminal of the second inductor L2 is electrically connected to a first terminal of the second capacitor C2, and a second terminal of the second capacitor C2 is electrically connected to the second terminal of the first capacitor c1.

Optionally, a series passive harmonic isolation unit 10 includes a resonant inductor $L_0$ and a resonant capacitor $C_0$, and the resonant inductor $L_0$ and the resonant capacitor $C_0$ resonate with a fundamental wave. The inductance $l_0$ of the resonant inductor $L_0$ and the capacitance $c_0$ of the resonant capacitor $C_0$ satisfy $\omega l_0 = 1/\omega c_0$, so the equivalent impedance of the series passive harmonic isolation unit 10 is zero for the fundamental wave, and the equivalent impedance for an n-th harmonic is $$Z_I^{(n)} = n\omega l_0 - \frac{1}{n\omega c_0} = \frac{n^2 - 1}{n} \omega l_0.$$

In other words, the series passive harmonic isolation unit 10 is equivalent to a wire for the fundamental wave, which allows the fundamental wave to pass through, and is equivalent to an inductor for the n-th harmonic, which presents inductive impedance and does not allow the n-th harmonic to pass through.

Figure 3:
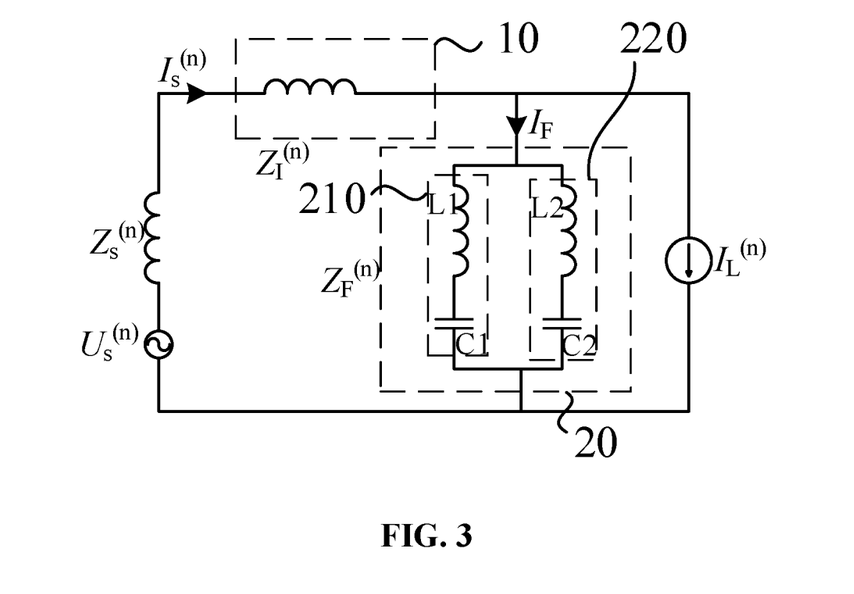
FIG. 3 is a diagram of an equivalent circuit at an n-th harmonic according to Embodiment two of the present disclosure.

Optionally, FIG. 3 is a diagram of an equivalent circuit at an n-th harmonic according to Embodiment two of the present disclosure. Referring to FIG. 2 and FIG. 3, a power grid 40 can be equated to a power supply, and the harmonic load 30 can be equated to a current source IL. A harmonic current can be expressed as $$I_s^{(n)} = \frac{Z_F^{(n)}}{Z_F^{(n)} + Z_s + Z_I^{(n)}} I_L^{(n)} + \frac{U_s^{(n)}}{Z_F^{(n)} + Z_s + Z_I^{(n)}},$$

where $Z_F^{(n)}$ denotes the equivalent impedance of a parallel passive filtering unit 20 at the n-th harmonic, $Z_s$ denotes the equivalent impedance of the power supply, and $U_s^{(n)}$ denotes a background harmonic voltage. Although the background harmonic voltage $U_s^{(n)}$ can be ignored in the power system analysis in the related art, it cannot be ignored in some specific cases. When $U_s^{(n)}$ is not ignored, the divided voltage which is obtained by using the primary winding of a transformer to divide the background harmonic voltage can be expressed as $$U_{AX}^{(n)} = \frac{Z_F^{(n)} I_L^{(n)} + U_s^{(n)}}{Z_F^{(n)} + Z_s + Z_I^{(n)}} Z_I^{(n)},$$

where $Z_I^{(n)} \gg Z_s$ and $Z_I^{(n)} \gg Z_F^{(n)}$, and $U_{AX}^{(n)} \approx Z_F^{(n)} I_L^{(n)} + U_s^{(n)}$. An n-th harmonic voltage of the parallel passive filtering unit 20, to which the background harmonic voltage is applied, is $$U_F^{(n)} = -\frac{Z_s + Z_I^{(n)}}{Z_F^{(n)} + Z_s + Z_I^{(n)}} Z_F^{(n)} I_L^{(n)} + \frac{Z_F^{(n)}}{Z_F^{(n)} + Z_s + Z_I^{(n)}} U_s^{(n)},$$

where $Z_I^{(n)} \gg Z_s$, and $Z_I^{(n)} \gg Z_F^{(n)}$, $U_F^{(n)} \approx -Z_F^{(n)} I_L^{(n)}$. From the above analysis, it is clear that the background harmonic voltage $U_s^{(n)}$ is mainly applied to the primary side of the transformer, i.e., to the series passive harmonic isolation unit 10, and will rarely appear at the harmonic load.

The parallel passive filtering unit 20 includes a third-order passive filtering branch 210 and a fifth-order passive filtering branch 220, where the third-order passive filtering branch 210 is composed of a first inductor L1 and a first capacitor c1 which are connected in series to form a third-order resonant circuit. The third-order passive filtering branch 210 can absorb a third harmonic, and in order to ensure the filtering effect of the parallel passive filtering unit 20, the inductance value $l_1$ of the first inductor L1 is relatively small and the capacitance value $c_1$ of the first capacitor C1 is very large. If the parallel passive filtering unit 20 only included the third-order passive filtering branch 210, the parallel passive filtering unit 20 would produce relatively large fundamental reactive power, thus forming overcompensation for reactive power, which will seriously affect the power grid. Therefore, the fifth-order passive filtering branch 220 is added to the parallel passive filtering unit 20, the fifth-order passive filtering branch 220 is connected in parallel with the third-order passive filtering branch 210, and the fifth-order passive filtering branch 220 includes a second inductor L2 and a second capacitor C2 connected in series. The t inductors and capacitors in the third-order passive filtering branch 210 and the fifth-order passive filtering branch 220 satisfy $1/\omega c_1 = 9\omega l_1$ and $1/\omega c_2 = 25\omega l_2$. If the impedance of coils of the first inductor L1 and second inductor L2, and the internal resistance of power supply $Z_s$ are ignored, the equivalent impedance of the parallel passive filtering unit 20 at the n-th harmonic, which includes the third-order passive filtering branch 210 and the fifth-order passive filtering branch 220, is $$Z_F^{(n)} = j\frac{1}{n} \times \frac{(n^2 - 9)(n^2 - 25)\omega l_1 \omega l_2}{(n^2 - 9)\omega l_1 + (n^2 - 25)\omega l_2},$$

where $\omega$ denotes a resonant angular frequency, $l_1$ denotes an inductance of the first inductor L1, $l_2$ denotes an inductance of the second inductor L2. Exemplarily, for the seventh harmonic, the equivalent impedance of the parallel passive filtering unit 20 is $$Z_F^{(7)} = j\frac{1}{7} \times \frac{40 \times 24 \omega l_1 \omega l_2}{40 \omega l_1 + 24 \omega l_2}.$$

The series passive harmonic isolation unit 10 has very large impedance $Z_I^{(n)}$ for the n-th harmonic, and the parallel passive filtering unit 20 presents relatively low impedance for the n-th harmonic, so the harmonic current $I_s^{(n)} = 0$ where $Z_F^{(7)} \ll Z_I^{(7)}$. It can be understood in this case that, a seventh-order passive filter can be omitted from the parallel passive filtering unit 20, and just the third-order passive filtering branch 210 and the fifth-order passive filtering branch 220 can realize passive filtering, thus reducing the number of passive devices and facilitating reactive power compensation for the fundamental wave.

Embodiment Three

Figure 4:
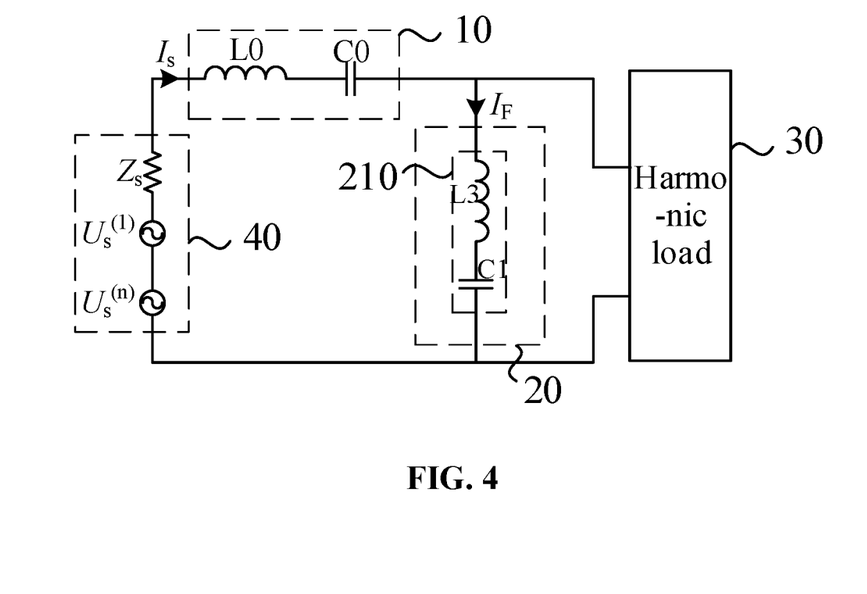
FIG. 4 is a structure diagram of a hybrid passive power filter according to Embodiment three of the present disclosure.

As another example of the embodiment of the present disclosure, a third-order passive filtering branch and a fifth-order passive filtering branch are replaced with a third-order passive filtering branch. FIG. 4 is a structure diagram of a hybrid passive power filter according to Embodiment three of the present disclosure. Referring to FIG. 3 and FIG. 4, based on the above multiple embodiments, the third-order passive filtering branch 210 and the fifth-order passive filtering branch 220 may be replaced with a third-order passive filtering branch 210. The third-order passive filtering branch 210 includes a third inductor L3 and a third capacitor C3. A first terminal of the third inductor L3 is electrically connected to an output terminal of a series passive harmonic isolation unit 10, a second terminal of the third inductor L3 is electrically connected to a first terminal of the third capacitor C3, and a second terminal of the third capacitor C3 is electrically connected to a second terminal of a harmonic load 30.

Exemplarily, a parallel passive filtering unit 20 may only employ the third-order passive filtering branch 210, and the third inductor L3 and the third capacitor C3 are connected in series to form a resonant circuit and satisfy $1/\omega c_3 = 9\omega l_3$. If the impedance of coils of the third inductor L3, and the internal resistance of power supply $Z_s$ are ignored, the equivalent impedance of the parallel passive filtering unit 20 at an n-th harmonic, which only adopts the third-order passive filtering branch 210, is $$Z_F^{(n)} = j\left(n\omega l_3 - \frac{1}{n\omega c_3}\right) = j\frac{n^2-9}{n}\omega l_3.$$

From this formula, it is to be understood that as the harmonic order increases, $Z_F^{(n)}$ gradually approaches $n\omega l_3$. When $Z_F^{(n)} \ll Z_I^{(n)}$, the harmonic current $I_s^{(n)} \approx 0$, thus achieving filtering of harmonics. The parallel passive filtering unit 20 employing the third-order passive filtering branch 210 can optimize the circuit structure and is easy to direct harmonics.

Embodiment Four

Figure 5:
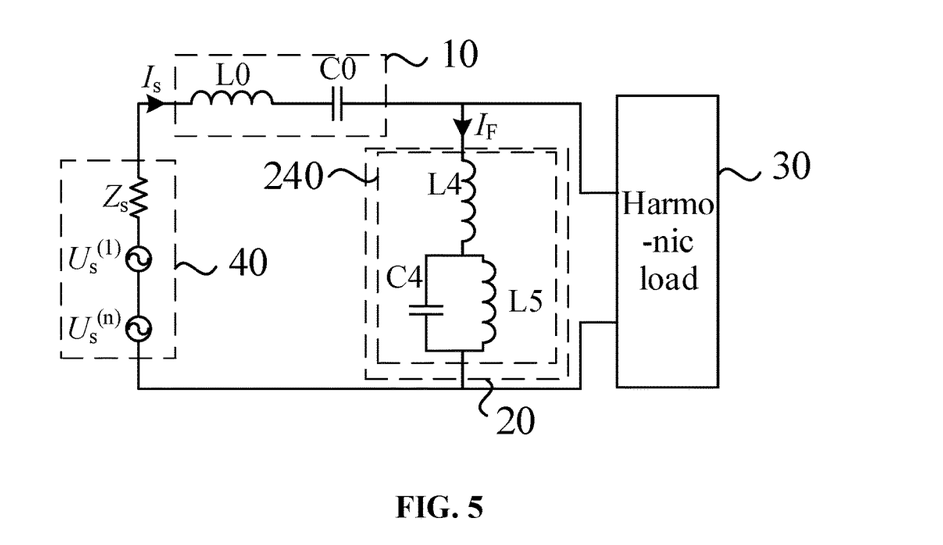
FIG. 5 is a structure diagram of a hybrid passive power filter according to Embodiment four of the present disclosure.

FIG. 5 is a structure diagram of a hybrid passive power filter according to Embodiment four of the present disclosure. Referring to FIGS. 3 and 5, based on the above multiple embodiments, a third-order passive filtering branch 210 and a fifth-order passive filtering branch 220 are replaced with a harmonic current absorbing branch 240.

Generally, a diode rectifier bridge structure having capacitors for filtering exists in a specific alternating current/direct current (AC/DC) converter circuit, and the power factor of the AC/DC converter circuit is close to 1. In such way, it is not required to provide a system with excessive fundamental reactive power, thus the parallel passive filtering unit 20 is required to have relatively high fundamental impedance. The high fundamental impedance can be achieved by replacing the third-order passive filtering branch 210 and the fifth-order passive filtering branch 220 with the harmonic current absorbing branch 240.

Still referring to FIG. 5, the harmonic current absorbing branch 240 provided by Embodiment four of the present disclosure includes a fourth inductor L4, a fifth inductor L5, and a fourth capacitor C4. A first terminal of the fourth inductor L4 is electrically connected to an output terminal of a series passive harmonic isolation unit 10, a second terminal of the fourth inductor L4 is electrically connected to a first terminal of the fourth capacitor C4, a second terminal of the fourth capacitor C4 is electrically connected to a second terminal of a harmonic load 30, and the fifth inductor L5 is connected in parallel with the fourth capacitor C4.

Exemplarily, when parallel resonance occurs at a fundamental frequency between the fifth inductor L5 and the fourth capacitor C4, $1/\omega c_4 = \omega l_5$. After the fifth inductor L5 and the fourth capacitor C4 are connected in parallel, series resonance occurs at an m-th harmonic frequency between the fifth inductor L5 and the fourth capacitor C4, and $$l_4 = \frac{1}{(m^2-1)\omega_m^2 c_4} = \frac{l_5}{m^2-1}.$$

Therefore, the harmonic current absorbing branch 240 is used as the parallel passive filtering unit 20, so that the equivalent impedance at the m-th harmonic can be close to zero and the parallel passive filtering unit 20 suffers a short circuit at the m-th harmonic, and thus the m-th harmonic current can be absorbed and the filtering is achieved. The equivalent impedance at a fundamental wave is close to infinity, and the fundamental wave will not pass through the harmonic current absorbing branch 240, so that no excessive fundamental reactive power will be generated. The equivalent impedance of the parallel passive filtering unit 20 at an n-th harmonic, which adopts the harmonic current absorbing branch 240, is $$Z_F^{(n)} = jn\omega l_5\left(\frac{1}{m^2-1} - \frac{1}{n^2-1}\right) = j\frac{n^2-m^2}{n^2-1}n\omega l_4.$$

For the hybrid passive power filter provided in the embodiment of the present disclosure, the specific structure of the parallel passive filtering unit 20 can be selected according to the harmonic content required by the system and the compensation for fundamental reactive power, which facilitates flexible application in the system in actual need of filtering. The series passive harmonic isolation unit and the parallel passive filtering unit are combined to filter out the harmonics in a power system, and the series passive harmonic isolation unit presents large impedance to harmonics and can isolate harmonics. The parallel passive filtering unit is connected in parallel with the harmonic load and the harmonics in the power system can be filtered out. The parallel passive filtering unit only includes passive devices such as an inductor and a capacitor, so that parallel passive filtering unit includes a simple structure and no control system is involved in parallel passive filtering unit, which is conducive to improving the reliability of the hybrid passive power filter and has easy access to a high-voltage system.

Embodiment Five

Figure 6:
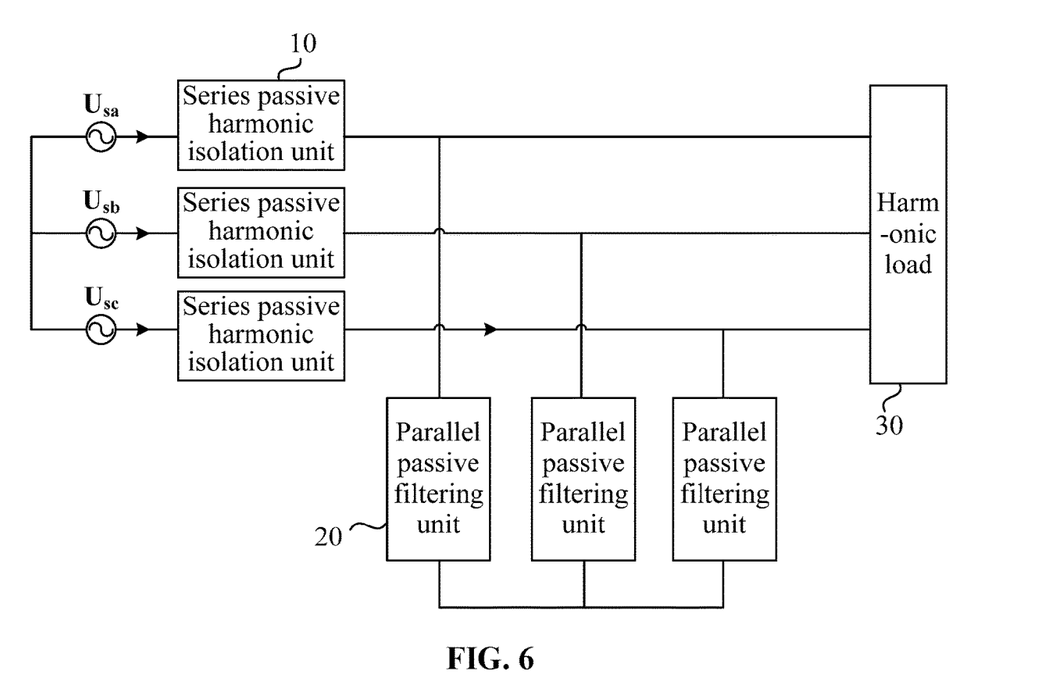
FIG. 6 is a structure diagram of a three-phase power system according to Embodiment five of the present disclosure.
Figure 7:
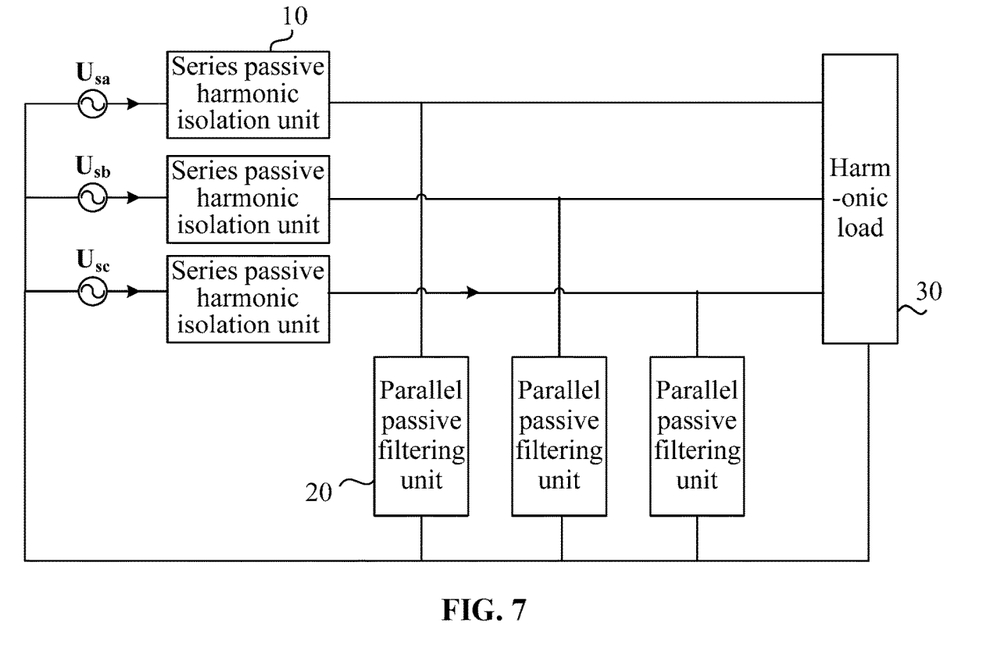
FIG. 7 is a structure diagram of another three-phase power system according to Embodiment five of the present disclosure.

FIG. 6 is a structure diagram of a three-phase power system according to Embodiment five of the present disclosure, and FIG. 7 is a structure diagram of another three-phase power system according to Embodiment five of the present disclosure. FIG. 6 is a structure diagram of a three-phase three-wire power system, and FIG. 7 is a structure diagram of a three-phase four-wire power system. Based on the above multiple embodiments, referring to FIGS. 6 and 7, a three-phase three-wire power system is formed by three sets of hybrid passive power filters, each of the hybrid passive power filters has a single-phase structure. When a neutral wire is configured at the side of a harmonic load 30 of the three-phase three-wire power system, a three-phase four-wire power system is formed. The three-phase power system provided by embodiments of the present disclosure includes the hybrid passive power filter provided by any embodiment of the present disclosure, and therefore the three-phase power system provided by embodiments of the present disclosure also has the beneficial effects described in the above multiple embodiments.

What is claimed is:

1. A hybrid passive power filter, comprising: a series passive harmonic isolation unit, a parallel passive filtering unit, and a harmonic load;
   wherein an input terminal of the series passive harmonic isolation unit is electrically connected to a power grid, an output terminal of the series passive harmonic isolation unit is electrically connected to a first terminal of the harmonic load directly, and the series passive harmonic isolation unit is configured to isolate harmonics; wherein an input terminal of the parallel passive filtering unit is electrically connected to the output terminal of the series passive harmonic isolation unit, an output terminal of the parallel passive filtering unit is electrically connected to a second terminal of the harmonic load directly, and the parallel passive filtering unit is configured to filter out harmonics; and
   wherein the parallel passive filtering unit comprises at least one of: a third-order passive filtering branch and a fifth-order passive filtering branch, the third-order passive filtering branch and the fifth-order passive filtering branch which are connected in parallel comprise one terminal which is electrically connected to the output terminal of the series passive harmonic isolation unit and comprise another terminal which is electrically connected to the second terminal of the harmonic load;

wherein the third-order passive filtering branch comprises a first inductor and a first capacitor;

wherein a first terminal of the first inductor is electrically connected to the output terminal of the series passive harmonic isolation unit, a second terminal of the first inductor is electrically connected to a first terminal of the first capacitor, and a second terminal of the first capacitor is electrically connected to the second terminal of the harmonic load; and wherein the fifth-order passive filtering branch comprises a second inductor and a second capacitor;

wherein a first terminal of the second inductor is electrically connected to the first terminal of the first inductor, a second terminal of the second inductor is electrically connected to a first terminal of the second capacitor, and a second terminal of the second capacitor is electrically connected to the second terminal of the first capacitor;

wherein an equivalent impedance of the parallel passive filtering unit is less than an equivalent impedance of the series passive harmonic isolation unit, wherein equivalent impedance of the parallel passive filtering unit at an n-th harmonic satisfies a following relationship:

$$Z_F^{(n)} = j\frac{1}{n} \times \frac{(n^2-9)(n^2-25)\omega l_1 \omega l_2}{(n^2-9)\omega l_1 + (n^2-25)\omega l_2}$$

wherein $\omega$ denotes a resonant angular frequency, $l_1$ denotes an inductance of the first inductor, and $l_2$ denotes an inductance of the second inductor, wherein a harmonic current of the harmonic load satisfies the following formula:

$$I_s^{(n)} = \frac{Z_F^{(n)}}{Z_F^{(n)} + Z_s + Z_I^{(n)}} I_L^{(n)} + \frac{U_s^{(n)}}{Z_F^{(n)} + Z_s + Z_I^{(n)}},$$

wherein $Z_F^{(n)}$ denotes the equivalent impedance of the parallel passive filtering unit at the n-th harmonic $Z_I^{(n)}$ denotes the equivalent impedance of the series passive harmonic isolation unit at the n-th harmonic, $Z_s$ denotes an equivalent impedance of the power supply, and $U_s^{(n)}$ denotes a background harmonic voltage in the power supply.

2. The hybrid passive power filter of claim 1, wherein the third-order passive filtering branch and the fifth-order passive filtering branch are replaced with a third-order passive filtering branch.

3. The hybrid passive power filter of claim 2, wherein the third-order passive filtering branch comprises a third inductor and a third capacitor; and wherein a first terminal of the third inductor is electrically connected to the output terminal of the series passive harmonic isolation unit, a second terminal of the third inductor is electrically connected to a first terminal of the third capacitor, and a second terminal of the third capacitor is electrically connected to the second terminal of the harmonic load.

4. The hybrid passive power filter of claim 3, wherein equivalent impedance of the third-order passive filtering branch at an n-th harmonic satisfies a following relationship:

$$Z_F^{(n)} = j(n\omega l_3 - \frac{1}{n\omega c_3})$$

wherein $\omega$ denotes a resonant angular frequency, $l_3$ denotes an inductance of the third inductor, and $c_3$ denotes a capacitance of the third capacitor.

5. The hybrid passive power filter of claim 1, wherein the third-order passive filtering branch and the fifth-order passive filtering branch are replaced with a harmonic current absorbing branch.

6. The hybrid passive power filter of claim 5, wherein the harmonic current absorbing branch comprises a fourth inductor, a fifth inductor and a fourth capacitor; and wherein a first terminal of the fourth inductor is electrically connected to the output terminal of the series passive harmonic isolation unit, a second terminal of the fourth inductor is electrically connected to a first terminal of the fourth capacitor, a second terminal of the fourth capacitor is electrically connected to the second terminal of the harmonic load, and the fifth inductor is connected in parallel with the fourth capacitor.

7. The hybrid passive power filter of claim 6, wherein equivalent impedance of the harmonic current absorbing branch at an n-th harmonic, which absorbs an m-th harmonic, satisfies a following relationship:

$$Z_F^{(n)} = jn\omega l_5(\frac{1}{m^2-1} - \frac{1}{n^2-1}) = j\frac{n^2-m^2}{n^2-1}n\omega l_4$$

wherein $\omega$ denotes a resonant angular frequency, $l_4$ denotes an inductance of the fourth inductor, and $l_5$ denotes an inductance of the fifth inductor.

8. A three-phase power system, comprising a hybrid passive power filter, wherein the hybrid passive power filter comprises:

a series passive harmonic isolation unit, a parallel passive filtering unit, and a harmonic load;

wherein an input terminal of the series passive harmonic isolation unit is electrically connected to a power grid, an output terminal of the series passive harmonic isolation unit is electrically connected to a first terminal of the harmonic load directly, and the series passive harmonic isolation unit is configured to isolate harmonics; wherein an input terminal of the parallel passive filtering unit is electrically connected to the output terminal of the series passive harmonic isolation unit, an output terminal of the parallel passive filtering unit is electrically connected to a second terminal of the harmonic load directly, and the parallel passive filtering unit is configured to filter out harmonics; and wherein the parallel passive filtering unit comprises at least one of: a third-order passive filtering branch and a fifth-order passive filtering branch, the third-order passive filtering branch and the fifth-order passive filtering branch which are connected in parallel comprise one terminal which is electrically connected to the output terminal of the series passive harmonic isolation unit and comprise another terminal which is electrically connected to the second terminal of the harmonic load;

wherein the third-order passive filtering branch comprises a first inductor and a first capacitor;

wherein a first terminal of the first inductor is electrically connected to the output terminal of the series passive harmonic isolation unit, a second terminal of the first inductor is electrically connected to a first terminal of the first capacitor, and a second terminal of the first capacitor is electrically connected to the second terminal of the harmonic load; and wherein the fifth-order passive filtering branch comprises a second inductor and a second capacitor;

wherein a first terminal of the second inductor is electrically connected to the first terminal of the first inductor, a second terminal of the second inductor is electrically connected to a first terminal of the second capacitor, and a second terminal of the second capacitor is electrically connected to the second terminal of the first capacitor;

wherein an equivalent impedance of the parallel passive filtering unit is less than an equivalent impedance of the series passive harmonic isolation unit;

wherein equivalent impedance of the parallel passive filtering unit at an n-th harmonic satisfies a following relationship:

$$Z_F^{(n)} = j\frac{1}{n} \times \frac{(n^2-9)(n^2-25)\omega l_1 \omega l_2}{(n^2-9)\omega l_1 + (n^2-25)\omega l_2},$$

wherein $\omega$ denotes a resonant angular frequency, $l_1$ denotes an inductance of the first inductor, and $l_2$ denotes an inductance of the second inductor;

wherein a harmonic current of the harmonic load satisfies the following formula, $$I_s^{(n)} = \frac{Z_F^{(n)}}{Z_F^{(n)} + Z_s + Z_I^{(n)}} I_L^{(n)} + \frac{U_s^{(n)}}{Z_F^{(n)} + Z_s + Z_I^{(n)}},$$

wherein $Z_F^{(n)}$ denotes the equivalent impedance of the parallel passive filtering unit at the n-th harmonic, $Z_I^{(n)}$ denotes the equivalent impedance of the series passive harmonic isolation unit at the n-th harmonic, $Z_s$ denotes an equivalent impedance of the power supply, $U_s^{(n)}$ denotes a background harmonic voltage in the power supply.

* * * * *